United States Patent
Barthelet et al.

(10) Patent No.: US 10,456,770 B2
(45) Date of Patent: Oct. 29, 2019

(54) HEAVY METAL CAPTURE MASS WITH IMPROVED PERFORMANCES

(71) Applicant: IFP Energies Nouvelles, Rueil-Malmaison (FR)

(72) Inventors: Karin Barthelet, Lyons (FR); Antoine Hugon, Givors (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/627,490

(22) Filed: Jun. 20, 2017

(65) Prior Publication Data

US 2017/0361302 A1 Dec. 21, 2017

(30) Foreign Application Priority Data

Jun. 21, 2016 (FR) ..................... 16 55765

(51) Int. Cl.
*B01J 20/02* (2006.01)
*B01J 20/28* (2006.01)
*B01J 20/30* (2006.01)
*B01J 20/32* (2006.01)
*B01J 20/08* (2006.01)
*B01D 53/64* (2006.01)
*B01D 53/02* (2006.01)

(52) U.S. Cl.
CPC .......... *B01J 20/0237* (2013.01); *B01D 53/02* (2013.01); *B01D 53/64* (2013.01); *B01J 20/0285* (2013.01); *B01J 20/08* (2013.01); *B01J 20/28011* (2013.01); *B01J 20/28016* (2013.01); *B01J 20/28019* (2013.01); *B01J 20/28021* (2013.01); *B01J 20/28073* (2013.01); *B01J 20/28076* (2013.01); *B01J 20/28092* (2013.01); *B01J 20/3078* (2013.01); *B01J 20/3085* (2013.01); *B01J 20/3204* (2013.01); *B01J 20/3236* (2013.01); *B01D 2253/104* (2013.01); *B01D 2253/1128* (2013.01); *B01D 2253/311* (2013.01); *B01D 2257/602* (2013.01); *B01J 2220/56* (2013.01)

(58) Field of Classification Search
CPC ....... B01D 53/64; B01J 20/0285; B01J 20/08; B01J 20/28011; B01J 20/28016; B01J 20/28019; B01J 20/28021; B01J 20/28073; B01J 20/28076; B01J 20/28092; B01J 20/3078; B01J 20/3085; B01J 20/3204; B01J 20/3236; B01J 20/0237

See application file for complete search history.

(56) References Cited

U.S. PATENT DOCUMENTS 6,033,556 A  3/2000 Didillon

FOREIGN PATENT DOCUMENTS

FR 2764214 A1 12/1998
FR 3022154 A1 12/2015

OTHER PUBLICATIONS

Machine translation of FR3022154A1 published Dec. 18, 2015 to Barthelet Karin of IFP Energies Nouvelles.

*Primary Examiner* — James A Fiorito
(74) *Attorney, Agent, or Firm* — Millen, White, Zelano & Branigan, P.C.

(57) ABSTRACT

A capture mass for heavy metals, in particular mercury, contained in a gaseous or liquid feed, said mass comprising:
  copper which is present at least in part in the sulphide form, $Cu_xS_y$;
  a porous support based on alumina;
characterized in that said porous support has a total pore volume (TPV) in the range 0.8 to 1.5 $cm^3/g$, a mesopore volume ($V_{6nm-100nm}$) in the range 0.5 to 1.3 $cm^3/g$, and a macropore volume ($V_{100nm}$) in the range 0.33 to 0.45 $cm^3/g$, it being understood that the ratio between the mesopore volume and the macropore volume ($V_{6nm-100nm}/V_{100nm}$) is in the range 1 to 5.

16 Claims, No Drawings

HEAVY METAL CAPTURE MASS WITH IMPROVED PERFORMANCES

FIELD OF THE INVENTION

The present invention relates to the field of treatment of liquid or gaseous effluents containing heavy metals, in particular effluents of oil origin and their derivatives such as gas of industrial origin, for example synthesis gas, natural gas and liquid hydrocarbons. More precisely, the invention concerns the capture of heavy metals, in particular mercury, which are present in a gaseous or liquid effluent.

PRIOR ART

It is known that certain natural feeds such as natural gas condensates, crude oils or cuts obtained from its distillation, or natural gas may contain a certain number of heavy metals, generally in the form of organometallic compounds.

Mercury is a metallic contaminant which is found in gaseous or liquid hydrocarbons produced in many regions of the world such as the Gulf of Niger, South America, North Africa or the Asia-Pacific region.

The elimination of mercury from hydrocarbons is desirable from an industrial viewpoint for a number of reasons.

Firstly, the presence of mercury in those hydrocarbons is a risk to operators working in contact with these substances because mercury is toxic. In its elemental form, mercury is volatile and runs severe risks of neurotoxicity by inhalation. In its organic form, mercury gives rise to risks which are similar to neurotoxicity by skin contact.

Secondly, the presence of mercury in hydrocarbons has a deleterious effect on conventional processing operations which are intended to upgrade those hydrocarbons. Conventionally, the hydrocarbons undergo catalytic reactions such as selective hydrogenation of the olefins produced by steam cracking or catalytic cracking of liquid hydrocarbons. However, the catalysts used, generally comprising noble metals such as platinum and palladium, can be deactivated by the mercury. In fact, mercury induces sintering of the catalysts by amalgamating with nanoparticles of noble metals. The reduction in the specific surface area of the catalysts leads to a very substantial loss of their catalytic activity.

For these reasons and more, it is desirable to eliminate or at least reduce the concentration of mercury in gaseous or liquid hydrocarbon effluents.

Industrially, the elimination of mercury from gaseous or liquid effluents is carried out by moving the effluent to be treated through guard beds filled with adsorbent materials, otherwise known as capture masses. The impurity to be eliminated, in this case mercury, is then irreversibly retained, preferably by chemisorption, within or at the surface of the capture mass and the effluent evacuated from the bed of capture mass is thus purified.

In a capture mass, mercury can be captured by reacting the mercury with an active phase based on elemental sulphur. In fact, elemental sulphur S reacts irreversibly with elemental mercury, $Hg°$, as follows:

$$Hg° \text{ (g/l)} + S \text{ (s)} \rightarrow HgS \text{ (s)} \qquad (1)$$

The term "$Hg°$ (g/l)" means that the mercury is dissolved in a gaseous (g) or liquid (l) fluid phase. In contrast, "(s)" denotes solid phases constituted by the active phase of the capture mass and by the reaction product.

Reaction (1) is spontaneous and has a negative free energy, $\Delta G$ (kJ/mole) over a wide temperature range, typically 0° C. to 150° C. The product formed, HgS, known as cinnabar or metacinnabar, is a chemically inert, mineral phase which is a solid over a vast range of temperatures. Thus, the mercury is trapped in the capture mass and the effluent to be treated is purified.

Conventionally, capture masses based on elemental sulphur are obtained by a method for impregnating elemental sulphur onto an activated charcoal type support.

However, capture masses based on elemental sulphur deposited on activated charcoal frequently suffer from stability problems when the effluent to be treated is liquid or when the effluent to be treated is gaseous and moist, because the active phase can be entrained by the water or another liquid. This phenomenon, linked to the low energetic interaction between the active phase and the surface of the activated charcoal and to the solubility of sulphur in these media, brings about a drastic drop in the service life of capture masses.

In order to overcome these disadvantages, it is possible to use capture masses based on metal sulphides deposited on supports with a controlled porosity such as aluminas, for example. Copper sulphide is notably used because of its stability and its low manufacturing costs. Patent document U.S. Pat. No. 7,645,306 describes the fact that elemental mercury ($Hg°$) reduces copper sulphide CuS irreversibly in accordance with the following reaction:

$$Hg° \text{ (g/l)} + 2CuS \text{ (s)} \rightarrow Cu_2S \text{ (s)} + HgS \text{ (s)} \qquad (2).$$

This reaction is a gas/solid or liquid/solid reaction which is more favoured from the point of view of its kinetics as the specific surface area of the active phase, in this case the CuS, is increased.

The support is generally based on alumina; its role consists of dispersing the active phase, and it has to have a texture which is suitable for capturing metallic impurities well.

The document FR 2 980 722 proposes using a capture mass based on a purely mesoporous support of the alumina gel type and an active phase constituted by a metal sulphide. The support has a monomodal pore distribution. That type of porosity has the advantage of developing a large specific surface area, but in contrast, it brings about a greater sensitivity to problems with capillary condensation, i.e. with the formation of liquid phases in the pores of the solid support if the gaseous effluent contains compounds which are termed "condensable" (water, hydrocarbons, etc), and poorer diffusivity of the mercury than in wider pores.

The document FR 2 764 214 describes a capture mass based on an extruded support essentially based on an alumina obtained from the rapid dehydration of hydrargillite (also known as flash alumina) and optionally an oxide or a sulphide of metals from the group constituted by copper, molybdenum, tungsten, iron, nickel or cobalt. The support has a pore distribution which minimizes the proportion of micropores (<6 nm) and macropores (>100 nm) while increasing the proportion of mesopores. The support has an at most bimodal pore distribution, or in fact preferably monomodal. The mean mesopore diameter is in the range 15 to 36 nm.

However, for such capture masses based on sulphides, it has been shown that beyond a certain content, the retention capacity for heavy metals of the capture mass prepared using an impregnation technique is only slightly or no longer improved despite an increase in the metal sulphide content. In fact, FIG. 5 of the article by W. R. A. M Robinson and J. C. Mol ("Characterization and Catalytic Activity of Copper/ Alumina Methanol Synthesis Catalysts", *Applied Catalysis*, 44 (1988) 165-177) shows that, for contents of more than 8.5% by weight of copper with respect to the mass of CuO/Al$_2$O$_3$ catalyst, the specific surface area of copper per gram of catalyst reduces. This can be explained by the fact that beyond a certain quantity of active phase, the copper oxide crystallites have a tendency to agglomerate into coarser clusters. This could render a portion of the active phase difficult to sulphurize, and thus bring about a loss in capture capacity if all of the CuO has not been sulphurized. Furthermore, the pore volume could be reduced, bringing about a deterioration in the material transfer of heavy metals through the pore network of the capture mass and thus a premature discharge of a portion of those heavy metals. For this reason, the copper capture masses disclosed in the document FR 2 764 214 include a copper content, expressed in terms of the oxides, which does not exceed 10% by weight with respect to the total weight of said capture mass.

Surprisingly, the Applicant has discovered that the use of capture masses comprising a support based on alumina, with a bimodal porosity and specific pore volume, can be used to increase the metal sulphide content in the capture mass while at the same time increasing the retention capacity for heavy metals, in contrast to what has been described in the prior art. The Applicant has developed a capture mass comprising a support with specific textural and structural properties which result in an improvement in the heavy metal capture performances, particularly for mercury.

Aims of the Invention

In a first aspect, the invention concerns a capture mass for heavy metals, in particular mercury, contained in a gaseous or liquid feed, said mass comprising:
  copper which is present at least in part in the sulphide form, $Cu_xS_y$;
  a porous support based on alumina;
characterized in that said porous support has a total pore volume (TPV) in the range 0.8 to 1.5 cm$^3$/g, a mesopore volume ($V_{6nm-100nm}$) in the range 0.5 to 1.3 cm$^3$/g, and a macropore volume ($V_{100nm}$) in the range 0.33 to 0.45 cm$^3$/g, it being understood that the ratio between the mesopore volume and the macropore volume ($V_{6nm-100nm}/V_{100nm}$) is in the range 1 to 5.

Advantageously, the copper content, expressed in terms of the oxides, is in the range 15% to 40% by weight with respect to the total weight of said capture mass.

Yet more preferably, the copper content, expressed in terms of the oxides, is in the range 18% to 35% by weight with respect to the total weight of said capture mass.

Preferably, the macropore volume ($V_{6nm-100nm}$) of said porous support is in the range 0.35 to 0.42 cm$^3$/g.

Preferably, said alumina support is obtained by shaping a starting alumina obtained from the rapid dehydration of hydrargillite.

Advantageously, the mesopore volume ($V_{6nm-100nm}$) of said porous support is in the range 0.55 to 1.0 cm$^3$/g.

Preferably, said capture mass contains at least 90% by weight of copper in the form $Cu_xS_y$ with respect to the total weight of copper.

Preferably, the porous support has a grain crush strength (GCS) of at least 0.68 daN/mm.

In a first variational embodiment, the capture mass in accordance with the invention is in the form of a bead.

In another variational embodiment, the capture mass in accordance with the invention is in the form of extrudates of the cylindrical, trilobed or multilobed, wheel or hollow cylindrical type.

Advantageously, 100% of the porous support is constituted by flash alumina.

In accordance with another aspect, the invention concerns a process for the preparation of a capture mass in accordance with the invention, comprising the following steps:
a) preparing a porous support based on alumina;
b) preparing an aqueous solution containing at least one dissolved copper precursor;
c) impregnating the solution obtained from step b) onto the alumina support obtained from step a);
d) allowing the impregnated support obtained from step c) to mature at a temperature in the range 20° C. to 60° C., for a period in the range 0.5 h to 8 h;
e) drying the solid obtained from step d) between 70° C. and 250° C.;
f) optionally, calcining the solid obtained at the end of step e), in air at a temperature in the range 300° C. to 800° C. in a dry atmosphere;
g) sulphurizing the solid obtained from step e) or f) to form an active sulphurized phase $Cu_xS_y$.

Preferably, the sulphurization step g) is carried out using a gaseous mixture of nitrogen and hydrogen sulphide with a molar concentration which is in the range 1000 ppm to 10% and at a temperature in the range 100° C. to 400° C.

In another aspect, the invention concerns the use of the capture mass in accordance with the invention or prepared in accordance with the process of the invention, for the elimination of heavy metals, in particular mercury, contained in a gaseous or liquid feed in which said capture mass is brought into contact with said feed.

DETAILED DESCRIPTION OF THE INVENTION

Definitions

In the disclosure of the invention below, the term "specific surface area" means the BET specific surface area determined by nitrogen adsorption in accordance with the standard ASTM D 3663-78 based on the BRUNAUER-EMMETT-TELLER method described in the periodical "The Journal of American Society", 60, 309, (1938).

The textural and structural properties of the capture mass are determined by characterization methods which are known to the person skilled in the art.

The total pore volume and the pore distribution are determined by mercury porosimetry (see Rouquerol F.; Rouquerol J.; Singh K. "Adsorption by Powders & Porous Solids: Principle, methodology and applications", Academic Press, 1999). More particularly, the total pore volume is measured by mercury porosimetry in accordance with the standard ASTM D4284-92 with a wetting angle of 140°, for example using an Autopore III™ model instrument made by Micromeritics™.

In accordance with the invention, the term $V_{100nm}$ means the volume generated by pores with a diameter of more than 100 nm (macropores), or macropore volume.

The term $V_{6nm-100nm}$ means the volume generated by pores with a diameter in the range 6 to 100 nm (mesopores), or mesopore volume.

Description

The present invention concerns a capture mass for heavy metals, and more particularly mercury, present in hydrocarbon cuts, a process for the preparation of said capture mass, as well as its use in the treatment of hydrocarbon cuts, and in particular for demercuration.

The capture mass in accordance with the invention comprises, and preferably consists of, copper which is present at least in part in the sulphide form, $Cu_xS_y$, and a porous support based on alumina, said porous support having a total pore volume (TPV) in the range 0.8 cm³/g to 1.5 cm³/g, with:
- a mesopore volume ($V_{6nm-100nm}$) in the range 0.50 to 1.3 cm³/g, preferably in the range 0.55 to 1.0 cm³/g;
- a macropore volume ($V_{100nm}$) in the range 0.33 to 0.45 cm³/g, preferably in the range 0.35 to 0.42 cm³/g; and yet more preferably in the range 0.35 to 0.40 cm³/g;

it being understood that the ratio between the mesopore volume and the macropore volume ($V_{6nm-100nm}/V_{100nm}$) is in the range 1 to 5.

In accordance with the invention, such a selection of macropore volume ($V_{100nm}$) means that accessibility to the active phase in the support is good, i.e. to the phase comprising copper which is at least partially in the sulphide form, $Cu_xS_y$. In fact, for a macropore volume ($V_{100nm}$) of less than 0.33 cm³/g, accessibility to the active phase is less good, whence a spread of the material transfer zone and premature breakthrough of the heavy metals, resulting in poorer capture of heavy metals. Furthermore, a macropore volume of more than 0.45 cm³/g is not desirable, as this would result in poor dispersion of the active phase, and thus result in poorer sulphurizability and poorer capture of heavy metals. Furthermore, the mechanical strength of the capture mass would be substantially degraded.

Advantageously, the copper content, expressed in terms of the oxides, is in the range 15% to 40% by weight, more preferably in the range 18% to 35% by weight, and yet more preferably in the range 20% to 35% by weight with respect to the total weight of the capture mass. In fact, it has been shown that for a capture mass comprising a narrow selection of macropore volume ($V_{100nm}$), i.e. a macropore volume in the range 0.33 to 0.45 cm³/g, preferably in the range 0.35 to 0.42 cm³/g, the quantity of copper present at least in a sulphide form, $Cu_xS_y$, may be increased in said capture mass, while presenting better results in terms of capture of heavy metals, in contrast to what is taught by the prior art, which indicates that a copper content of more than 8.5% by weight, in the form of the oxides, with respect to the total weight of the capture mass does not bring about an improvement, but rather degrades the adsorption properties of the capture masses (see FIG. 5 of the article by W. R. A. M Robinson and J. C. Mol: "Characterization and Catalytic Activity of Copper/Alumina Methanol Synthesis Catalysts", *Applied Catalysis*, 44 (1988) 165-177).

Furthermore, in accordance with the invention, the range of mesopore volume ($V_{6nm-100nm}$) of the support for the capture mass means that the dispersion of the active phase in the support is good, i.e. of the phase comprising the copper present at least partially in the sulphide form, $Cu_xS_y$. For a mesopore volume of less than 0.50 cm³/g, the active phase is poorly dispersed, which results in a poorer sulphurizability and possibly poorer capture of the heavy metals.

The total pore volume (TPV) is measured as follows: the value for the grain density and absolute density is determined: the grain density (Dg) and absolute density (Da) are respectively measured using the mercury porosimetry method and helium pycnometry method; the TPV is given by the formula:

$$VPT = \frac{1}{Dg} - \frac{1}{Da}$$

The pore volumes $V_{100nm}$ and $V_{6nm-100nm}$ may be measured using the following method:

1/ Determining the total pore volume (TPV): a grain density (Dg) is determined using mercury porosimetry, and an absolute density (Dab) is measured using helium pycnometry, then the TPV (mL/g) is calculated as 1/Dg−1/Dab;

2/ Determining the pore volume by mercury porosimetry ($V_{Hg}$) [Rouquerol F.; Rouqerol J.; Singh K. Adsorption by powders & porous solids: Principle, methodology and applications, Academic Press, 1999]

3/ $V_{100nm}$=TPV−$V_{Hg}$; $V_{6nm-100nm}$=TPV−$V_{Hg}$

The support used in the capture mass generally comprises a micropore volume ($V_{0-6nm}$) of at most 0.15 cm³/g, preferably at most 0.1 cm³/g. The micropore volume represents the volume generated by pores with a diameter of less than 6 nm. The pore volume $V_{0-6nm}$ may be measured using the t-plot method applied to data obtained from $N_2$ porosimetry [Rouquerol F.; Rouqerol J.; Singh K. Adsorption by powders & porous solids: Principle, methodology and applications, Academic Press, 1999].

Advantageously, the pore distribution over the pore diameter range in the range 6 nm to 100 nm (mesopores) is extremely narrow at around 25 nm, i.e. in this range, the majority of pores have a diameter in the range 15 to 50 nm, preferably in the range 20 to 30 nm. A pore distribution of this type, i.e. a distribution for which the proportion of large mesopores is optimized, is particularly suited to the diffusional constraints of heavy metal capture masses.

The mean mesoporous diameter for a given support is measured on the basis of the graphical representation of the pore distribution of said support. It is a diameter for which the associated volume V on a graphical representation is replaced by:

$$V = V_{100nm} + \frac{V_{6nm} - V_{100nm}}{2}$$

where:

$V_{100nm}$ represents the volume generated by pores with a diameter of over 100 nm (macropores), or the macropore volume;

$V_{6nm}$-$V_{100nm}$ represents the mesopore volume, i.e., the volume generated by pores with a diameter in the range 6 nm and 100 nm.

These volumes are measured using the mercury porosimetry technique, in which the Kelvin law is applied which defines a relationship between the pressure, the diameter of the smallest pore into which the diameter penetrates at said pressure, the wetting angle and the surface tension in accordance with the following formula:

$$Ø=(4t \cos θ)·10/P$$

where:
- Ø represents the pore diameter (in nm);
- t represents the surface tension (48.5 Pa);
- θ represents the angle of contact (θ=140°); and
- P represents the pressure (MPa).

The porous support in accordance with the invention may generally have a specific surface area $S_{BET}$ of at least 100 m²/g, preferably at least 120 m²/g. The term "BET surface area" means the specific surface area determined by nitrogen adsorption in accordance with the standard ASTM D 3663-78 established using the BRUNAUER-EMMETT-TELLER method described in "The Journal of the American Society" 60, 309 (1938).

In one embodiment of the invention, the capture mass may be in the shape of cylindrical, multilobed, wheel or hollow cylindrical extrudates or in any other geometric shape used by the person skilled in the art. In this embodiment, said capture mass has a diameter in the range 0.5 to 10 mm, preferably in the range 0.8 to 3.2 mm, and a length in the range 1 mm to 20 mm, preferably in the range 1 to 10 mm, especially when said capture mass is employed in fixed bed mode.

In another embodiment of the invention, the capture mass is in bead form. In this embodiment, said capture mass has a diameter in the range 0.5 to 10 mm, preferably in the range 0.8 to 3.2 mm.

The capture mass in accordance with the invention preferably has at least 90% (mol/mol) of copper in the form $Cu_xS_y$, highly preferably at least 95% (mol/mol) of copper sulphide in the form $Cu_xS_y$. The fraction of copper contained in the sulphide form, $Cu_xS_y$, constituting the active phase preferably satisfies $x \leq 2$, more preferably $x \leq 1$, and highly preferably $x=1$. The fraction of sulphur contained in the sulphide form, $Cu_xS_y$, preferably satisfies $y \leq 2$, more preferably $y \leq 1$ and highly preferably $y=1$. More advantageously, the capture mass in accordance with the invention is such that the fraction of copper and the fraction of sulphur in the sulphide form obey the equalities $x=1$ and $y=1$.

In the context of the present invention, the expression "copper sulphide" designates chemical compounds of the type $Cu_xS_y$, with $0.5 \leq x$; $y \leq 2$, preferably $x=1$ and $y=1$. Preferably, the expression "copper sulphide" designates CuS.

In accordance with the invention, the porous support has a grain crush strength (GCS) of at least 0.68 daN/mm for extrudates with a diameter of 1.6 mm, preferably at least 1 mm, and a crush strength (CS) of at least 1 MPa.

The method for measuring the grain crush strength (GCS) consists of measuring the type of maximum compression which an extrudate can support before it fails, when the product is placed between two planes being displaced at a constant speed of 5 cm/min. Compression is applied perpendicular to one of the extrudate generatrices, and the crush strength is expressed as the ratio of the force to the length of the generatrix of the extrudate.

The method used to measure the crush strength (CS) consists of submitting a certain quantity of extrudates to an increasing pressure over a sieve and recovering the fines resulting from crushing the extrudates. The crush strength corresponds to the force exerted to obtain fines representing 0.5% of the weight of the extrudates under test.

The alumina or aluminas of the porous support used in the capture mass are of the $\chi$, $\eta$, $\gamma$ or $\delta$ type. Preferably, they are of the $\gamma$ or $\delta$ type.

The capture mass in accordance with the invention may be prepared using any method known to the person skilled in the art, and more particularly using the methods described below. As an example, it is possible to prepare the capture mass in accordance with the invention using a preparation process comprising the following steps:

a) preparing a porous support based on alumina;
b) preparing an aqueous solution containing at least one dissolved copper precursor;
c) impregnating the solution obtained from step b) onto the alumina support obtained from step a);
d) allowing the impregnated support obtained from step c) to mature in a closed vessel saturated with water at a temperature which is advantageously in the range 20° C. to 60° C., for a period which is advantageously in the range 0.5 h to 8 h;
e) drying the solid obtained from step d), advantageously at between 70° C. and 250° C.;
f) optionally, calcining the solid obtained at the end of step e), in air at a temperature in the range 300° C. to 800° C., preferably at a temperature in the range 350° C. to 600° C.;
g) sulphurizing the solid obtained from step e) or f).

In accordance with the preparation process in accordance with the invention, the capture mass in the oxide state obtained from step e) or f) undergoes a final sulphurization step g) in order to place it in the active form $Cu_xS_y$, for the purposes of capturing heavy metals. This sulphurization method may be carried out using any method resulting in the formation of sulphides of metals and preferably resulting in the phase CuS when copper is used. The sulphur is generally provided by hydrogen sulphide or any organo-sulphur precursor known to the person skilled in the art. The sulphurization step is carried out in the gas phase ex situ or in situ; preferably, it is carried out in the gas phase ex situ, i.e. outside the capture unit. Preferably, the final sulphurization g) is carried out at atmospheric pressure.

Advantageously, the capture mass in the oxide state is sulphurized by means of a gaseous mixture of nitrogen and hydrogen sulphide with a molar concentration which is in the range 1000 ppm to 10% and preferably in the range 0.5% to 6%, at a temperature in the range 25° C. to 400° C., preferably in the range 50° C. to 250° C.

Preferably, the level of sulphurization of the capture mass, defined as the ratio of the number of moles of sulphur contained in the capture mass with respect to the number of moles of metal contained in the capture mass in the oxide state, is greater than or equal to 0.85, preferably greater than or equal to 0.95, and highly preferably more than 0.98. Advantageously, the degree of sulphurization is equal to 1.

In step a), the porous alumina-based support may be synthesized using various methods known to the person skilled in the art.

A first method for the synthesis of an alumina support is as follows. A precursor of the aluminium trihydroxide type, $Al(OH)_3$, also known as hydrargillite or gibbsite, for example obtained from the process generally known as the "Bayer" process, is rapidly dehydrated. This dehydrated precursor is shaped, for example by granulation, then undergoes a hydrothermal treatment and finally a calcining treatment in order to obtain the desired alumina. This method is described in more detail, for example, in the section entitled "Alumina" by P. Euzen, P. Raybaud, X. Krokidis, H. Toulhoat, J. L. Le Loarer, J. P. Jolivet and C. Froidefond, in the "Handbook of Porous Solids" (F. Schüth, K. S. W. Sing and J. Weitkamp, Wiley-VCH, Weinheim, Germany, 2002). This method can be used to produce an alumina generally known as "flash alumina".

A second method for synthesizing the alumina support is as follows. A gel is initially obtained from a precursor of the aluminium gamma-oxy(hydroxide) type, AlO(OH), also known as boehmite, with high specific surface areas in the range 150 to 600 m$^2$/g. The boehmite gel may, for example, be obtained by precipitation from basic and/or acidic solutions of aluminium salts induced by changing the pH or any other method which is known to the skilled person. This gel is then shaped, for example by mixing/extrusion. Next, a series of thermal or hydrothermal treatments is carried out on the product, resulting in production of the alumina. This method is also described in the section entitled "Alumina" by P. Euzen, P. Raybaud, X. Krokidis, H. Toulhoat, J. L. Le Loarer, J. P. Jolivet and C. Froidefond, in the "Handbook of Porous Solids" (F. Schüth, K. S. W. Sing and J. Weitkamp, Wiley-VCH, Weinheim, Germany, 2002). This method can be used to produce an alumina which is generally known as "alumina gel".

The porous solid support of the invention may comprise sodium. The weight content of the porous solid support, as the oxide of sodium, $Na_2O$, may be in the range 0 ppm by weight to 5000 ppm by weight with respect to the total weight of the porous solid, preferably in the range 100 ppm by weight to 5000 ppm by weight, and more preferably in the range 1000 ppm by weight to 5000 ppm by weight.

Advantageously, step b) is carried out by adjusting the quantities of precursors as a function of the desired quantity of copper on the mass in the final state. Preferably, the precursors are selected from the group constituted by copper carbonate, copper hydroxide, copper nitrate, copper hydroxynitrate, copper chloride, copper acetate and copper citrate. Preferably, the copper precursor is copper nitrate.

In a preferred variation of the preparation process, during step c), the metallic precursor solution is introduced by dry impregnation.

Maturation of the impregnated support obtained from step c) in the closed vessel saturated with water is preferably carried out during step d) at a temperature in the range 25° C. to 50° C. for a period in the range 1 h to 4 h.

The solid obtained from step d) is preferably dried between 70° C. and 130° C., more preferably between 70° C. and 110° C.

In the particular embodiment in which a calcining step f) is carried out, the solid obtained from step e) is preferably calcined in air at a temperature in the range 300° C. to 800° C., preferably at a temperature in the range 350° C. to 600° C. in dry or moist air. Preferably, during step f), the solid is calcined in air with a relative humidity at 25° C. in the range 10% to 80%, preferably in the range 15% to 50%.

The capture mass in accordance with the invention, which may have been prepared as described above, may advantageously be used as a capture mass for heavy metals. The present invention also concerns a process for capturing heavy metals in a gaseous or liquid effluent with the aid of the capture mass as described above.

The gaseous or liquid effluent to be treated may contain heavy metals, for example mercury, arsenic or lead, in various forms. As an example, mercury may be found in the Hg° form, corresponding to elemental or atomic mercury, in the molecular form and/or in the ionic form, for example $Hg^{2+}$ and its complexes. The concentration of heavy metals in the gaseous or liquid effluent to be treated may vary. The gaseous effluent to be treated may preferably contain between 10 ng and 1 g of mercury per $Nm^3$ of gas. The liquid effluent to be treated may preferably contain between 10 ng and 1 g of mercury per $m^3$ of liquid. Further, this gaseous or liquid effluent to be treated may contain arsenic and/or lead in different forms. The quantity of lead in the effluent may be in the range 1 ppt (parts per trillion, i.e. $10^{-12}$) by weight to 100 ppm (parts per million, i.e. $10^{-6}$) by weight, and the quantity of arsenic may be in the range 100 ppt by weight to 100 ppb (parts per billion, i.e. $10^{-9}$) by weight. These heavy metals are a nuisance for safety reasons and for reasons of the efficiency of the treatments for these effluents, and so advantageously they have to be eliminated using the capture mass of the invention, or at least their contents have to be reduced. Finally, the effluent to be treated may contain other elements such as sulphur and nitrogen in various forms. In particular, the sulphur may be present in the form of mercaptans, organic sulphur or indeed, thiophene. The sulphur content of the effluent may be in the range 1 ppt by weight to 1000 ppm by weight, and the nitrogen content may be in the range 1 ppt by weight to 100 ppm by weight. Advantageously, neither the nitrogen nor the sulphur which may be present in the effluent to be treated causes drops in the performance of the capture masses of the invention.

The capture mass of the present invention can be used to treat both liquid and gaseous effluents. Further, the effluent may be a moist gas or a gas containing vapours of condensable compounds without notably reducing the service life of the capture mass. The hygrometry ratio of the gaseous effluent, defined as the ratio of the partial pressure of water to the saturated vapour pressure of water at a given temperature, may be in the range 0 to 100%, preferably in the range 1% to 95%, and more preferably in the range 2% to 90%.

The use of the capture mass of the invention is particularly suited to the treatment of liquid or gaseous effluents of oil origin and their derivatives. Such effluents routinely contain heavy metals. The gaseous or liquid effluent to be treated in the process of the invention may advantageously be selected from the group constituted by combustion fumes, synthesis gas, natural gas, natural gas condensates, petroleum, liquid or gaseous oil cuts, petrochemical intermediates and mixtures thereof. Preferably, the gaseous or liquid effluent to be treated in the process of the invention is advantageously selected from the group constituted by combustion fumes, synthesis gas, natural gas, natural gas condensates, crude oil and liquid hydrocarbon cuts from the refinery or from a petrochemicals plant.

Combustion fumes are in particular produced by the combustion of hydrocarbons, biogas and coal in a boiler or by a combustion gas turbine, for example with the intention of producing electricity. The temperature of these fumes is generally in the range 20° C. to 60° C., with a pressure generally in the range 0.1 MPa (1 bar) to 0.5 MPa (5 bar) and may comprise, by volume, between 50% and 80% of nitrogen, between 5% and 40% of carbon dioxide, between 1% and 20% of oxygen, and impurities such as $SO_x$ and $NO_x$ if these impurities have not been eliminated downstream by a deacidification process.

Synthesis gas is a gas containing carbon monoxide CO, hydrogen $H_2$ in a molar $H_2/CO$ ratio which is generally equal to approximately 2, steam, generally saturated, and carbon dioxide $CO_2$ which generally has a content of approximately 10% by volume. The pressure of the synthesis gases which are most frequently encountered in the industry is generally in the range 2 MPa (20 bars) to 3 MPa (30 bars), but it may reach 7 MPa (70 bars). In addition, synthesis gas may contain sulphur-containing impurities ($H_2S$, COS . . . ), nitrogen-containing impurities ($NH_3$, HCN . . . ) and halogen-containing impurities.

Natural gas is primarily constituted by gaseous hydrocarbons, but it may contain some of the following acidic compounds: carbon dioxide $CO_2$, hydrogen sulphide $H_2S$, mercaptans, carbon oxysulphide COS and carbon disulphide $CS_2$. The quantity of these acidic compounds in natural gas can vary widely and may be up to 40% by volume for $CO_2$ and $H_2S$. The temperature of the natural gas which is most frequently employed in the industry may be in the range 20° C. to 100° C., and its pressure may be in the range 1 MPa (10 bars) to 20 MPa (200 bars).

Natural gas condensates are constituted by liquid hydrocarbons the production of which is associated with the production of natural gas. These complex liquid mixtures are very similar to crude oils.

Particular examples of liquid refinery hydrocarbons which may be cited are LPG (C3-C4 cut), naphthas (C5-C8 cut), kerosenes and diesels.

Liquid hydrocarbons from petrochemicals plants which may in particular be cited are LPG (C3-C4 cut) and cracked gasolines (or "pyrolysis gasoline", also known as "Pygas").

In the process for capturing heavy metals in a gaseous or liquid effluent in accordance with the invention, said effluent is brought into contact with the capture mass of the invention. This contact may preferably be carried out by injecting the effluent to be treated into a reactor containing the capture mass in the form of a fixed bed.

This contact of the effluent to be treated with the capture mass in the process of the invention may be carried out at a temperature in the range −50° C. to 115° C., preferably in the range 0° C. to 110° C., more preferably in the range 20° C. to 100° C. Further, it can be carried out at an absolute pressure in the range 0.01 MPa (0.1 bar) to 20 MPa (200 bars), preferably in the range 0.1 MPa (1 bar) to 15 MPa (150 bars), and more preferably in the range 0.1 MPa (1 bar) to 12 MPa (120 bars).

In addition, this step for bringing the effluent to be treated into contact with the capture mass may be carried out with an HSV in the range $0.1\ h^{-1}$ to $50000\ h^{-1}$. The term "HSV" means the hourly space velocity of the gaseous or liquid effluent in the capture mass, i.e. the volume of gaseous or liquid effluent per volume of reactor and per hour. For a gaseous effluent to be treated, the HSV may preferably be in the range $50\ h^{-1}$ to $500\ h^{-1}$. For a liquid effluent to be treated, the hourly space velocity may be in the range $0.1\ h^{-1}$ to $50\ h^{-1}$.

Prior to bringing the liquid or gaseous effluent to be treated into contact with the capture mass, said gaseous or liquid effluent may be pre-treated. This pre-treatment may consist of heating or cooling, pressurizing or depressurizing, and/or a purification treatment for eliminating or reducing the content of a compound that is deemed to be unwanted in the effluent. As an example, the pre-treatment may comprise a step for reducing the relative humidity of a gaseous effluent. The reduction in the relative humidity of a gaseous effluent may be obtained using any means known to the skilled person, in particular a capture mass for water, for example a molecular sieve based on zeolite, a glycol process as described, for example, in document WO 2005/047438, a step for heating the effluent in a heat exchanger to raise its temperature, for example by 3° C. to 10° C., or a step for cooling the effluent.

Contact with the capture mass may advantageously be used to capture heavy metals contained in the effluent to be treated and to obtain an effluent with a heavy metal content which is reduced with respect to the initial effluent content, or indeed to completely eliminate the heavy metals from the effluent.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1655765, filed Jun. 21, 2016 are incorporated by reference herein.

EXAMPLES

Four capture masses (M1, M2, M3, M4) were prepared using different porous supports (respectively S1, S2 and S3 and S4). For the masses M1, M2, M3 and M4, the envisaged copper content on the oxide precursors of the capture masses was 22% by weight of copper, expressed in terms of the oxides, with respect to the total weight of the oxide precursor of the capture mass.

The pore volumes for the supports are reported in Table 1 below. The pore volumes were measured by mercury porosimety (see Rouquerol F.; Rouquerol J.; Singh K. "Adsorption by Powders & Porous Solids: Principle, methodology and applications", Academic Press, 1999).

TABLE 1

Pore volumes of supports S1 to S4

| Support | $V_t$ (cm³/g) | $V_{6\text{-}100\ nm}$ (cm³/g) | $V_{100\ nm}$ (cm³/g) | $V_{6\text{-}100\ nm}/V_{100\ nm}$ | GCS (daN/mm) |
|---|---|---|---|---|---|
| S1 (comparative) | 0.94 | 0.44 | 0.50 | 0.88 | 0.66 |
| S2 (comparative) | 0.81 | 0.66 | 0.15 | 4.4 | 0.90 |
| S3 (comparative) | 0.92 | 0.13 | 0.79 | 0.16 | 0.32 |
| S4 (invention) | 1.00 | 0.65 | 0.35 | 1.86 | 1.11 |

Support S1 had a macropore volume ($V_{100nm}$) and a mesopore volume ($V_{6\text{-}100nm}$) below that of the support used in the context of the capture mass in accordance with the invention.

The support S2, corresponding to the alumina C, disclosed in the document FR 2 764 214, had a macropore volume ($V_{100nm}$) below the macropore volume of the support used in the context of the capture mass in accordance with the invention.

The support S3 had a macropore volume ($V_{100nm}$) higher than the macropore volume of the support used in the context of the capture mass in accordance with the invention.

The support S4 was in accordance with the support used in the context of the capture mass in accordance with the invention.

Starting from these porous supports, the capture masses M1 to M4 were all prepared as follows:

- an impregnation solution was prepared by dissolving $Cu(NO_3)_2 \cdot 3H_2O$ in a volume of water in order to obtain the volume necessary to fill the entire pore volume of the alumina support (concentration of solutions 5.84, 6.20, 6.13 and $5.13 \times 10^{-6}$ mol/L of $Cu^{2+}$ respectively for the supports S1, S2, S3 and S4);
- the porous support (respectively S1, S2, S3 or S4) was impregnated by slowly spraying with said solution prepared in the preceding step;
- the product obtained in the preceding step was allowed to mature in a closed vessel for 3 hours at ambient temperature;
- the material obtained in the preceding step was dried at 90° C. for 3 h;
- the material obtained in the preceding step was calcined at 450° C. in a moist atmosphere for 45 min in a tube furnace;
- the product obtained in the preceding step was sulphurized at atmospheric pressure in a stream of nitrogen containing 5% molar of $H_2S$ in nitrogen at a temperature of 250° C.

The copper content of the capture masses was measured by X ray fluorescence using an Axios mAX instrument from PANanalytical. The sulphur content was measured with the aid of a CHNS/O Flash 2000® analyser from ThermoFisherScientific.

The sulphurizing capability of the capture masses was estimated from a calculation of the atomic ratio between the sulphur and the copper present in the mass. This ratio S/Cu was calculated from the elemental sulphur and copper contents measured for the capture masses and from the molar masses. A ratio of close to 1 corresponds to a mass in which the copper is extremely well sulphurized because the formulation approaches that of CuS; a ratio well below 1 corresponds to a mass which is less sulphurizable.

The copper and sulphur contents and the degree of sulphurization are recorded in Table 2 below.

TABLE 2

Properties of masses M1 to M4

| Capture mass | % Cu | % S | S/Cu |
| --- | --- | --- | --- |
| M1 (comparative) | 21.5 | 8.7 | 0.80 |
| M2 (comparative) | 21.2 | 10.3 | 0.96 |
| M3 (comparative) | 21.4 | 7.2 | 0.67 |
| M4 (in accordance with the invention) | 21.6 | 10.4 | 0.95 |

The masses M1 and M3, with a volume $V_{100nm}$ (volume represented by pores over 100 nm) which was high with respect to the capture mass M4 in accordance with the invention, had a much lower degree of sulphurization and thus a much smaller quantity of active phase. This is attributed to the fact that in the presence of too many large pores, the active phase is poorly dispersed at the surface of the support and thus is sulphurized less well.

The masses M1 to M4 were then evaluated as regards mercury capture in the gas phase (3500 µg/Nm$^3$ in N$_2$) at 50° C. under 20 bars (2 MPa) in a stream of 0.3 Nm$^3$/h through a fixed bed of 18 cm$^3$. As soon as the concentration of mercury at the outlet reached 1% of the concentration of the inlet stream, it was assumed that the mass had to be changed. The longer the time taken to observe breakthrough of the mercury, the more effective the capture mass is adjudged to be. These times are recorded for each capture mass in Table 3 below.

TABLE 3

Time necessary to obtain a concentration of mercury at the fixed bed outlet equivalent to 1% of its inlet concentration

| Capture mass | Time (days) |
| --- | --- |
| M1 (comparative) | 33 |
| M2 (comparative) | 62 |
| M3 (comparative) | 21 |
| M4 (in accordance with the invention) | 75 |

The capture mass M4 (in accordance with the invention) is the most effective capture mass even though said masses all had the same quantity of copper initially deposited at their surface.

For the mass M2, its poorer efficiency was attributed to too small a quantity of macropores, which had a deleterious effect on the transport of molecules of mercury and thus brought about premature breakthrough of the mass.

For the masses M1 and M3, the poor sulphurization of the oxide precursor resulted in a capture mass with respectively 20% and 33% less active phase compared with the mass M4.

However, the difference in their dynamic capacities compared with that of the mass M4 in accordance with the invention was greater than 20% and 33%. The poor dispersion of the active phase thus also brought about limitations to the reaction of mercury with the active phase CuS. In addition, for the mass M3, fine particles were recovered at the end of the test. Since this mass had low mechanical strength, some of its beads were crushed during use as a fixed bed.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A capture mass capable of capturing heavy metals including mercury, contained in a gaseous or liquid feed, said mass comprising:
    copper which is present at least in part in the sulphide form, $Cu_xS_y$;
    a porous support based on alumina;
    said porous support having a total pore volume (TPV) in the range 0.8 to 1.5 cm$^3$/g, a mesopore volume ($V_{6nm-100nm}$) in the range 0.5 to 1.3 cm$^3$/g, a macropore volume ($V_{100nm}$) in the range 0.33 to 0.45 cm$^3$/g, and a
    ratio between the mesopore volume and the macropore volume ($V_{6nm-100nm}/V_{100nm}$) of 1 to 1.86.

2. The capture mass as claimed in claim 1, having a copper content, expressed in terms of oxides, in the range 15% to 40% by weight with respect to the total weight of said capture mass.

3. A capture mass capable of capturing heavy metals including mercury, contained in a gaseous or liquid feed, said mass comprising:
    copper which is present at least in part in the sulphide form, $Cu_xS_y$;
    a porous support based on alumina;
    said porous support having a total pore volume (TPV) in the range 0.8 to 1.5 cm$^3$/g, a mesopore volume ($V_{6nm-100nm}$) in the range 0.5 to 1.3 cm$^3$/g, a macropore volume ($V_{100nm}$) in the range 0.33 to 0.45 cm$^3$/g, and a
    ratio between the mesopore volume and the macropore volume ($V_{6nm-100nm}/V_{100nm}$) in the range 1 to 1.86, and having a copper content, expressed in terms of oxides, in the range 18% to 35% by weight with respect to the total weight of said capture mass.

4. The capture mass as claimed in claim 1, wherein the macropore volume ($V_{100nm}$) is 0.35 to 0.42 cm$^3$/g.

5. The capture mass as claimed in claim 1, wherein the alumina support is obtained by shaping a starting alumina obtained from the rapid dehydration of hydrargillite.

6. The capture mass as claimed in claim 1, wherein the mesopore volume ($V_{6nm-100nm}$) of said porous support is 0.55 to 1.0 cm$^3$/g.

7. The capture mass as claimed in claim 1, containing at least 90% by weight of copper in the form $Cu_xS_y$ with respect to the total weight of copper.

8. The capture mass as claimed in claim 1, wherein the porous support has a grain crush strength (GCS) of at least 0.68 daN/mm.

9. The capture mass as claimed in claim 1, in the form of a bead.

10. The capture mass as claimed in claim 1, in the form of cylindrical, trilobed or multilobed, wheel or hollow cylinder extrudates.

11. The capture mass as claimed in claim 1, wherein 100% of the porous support is flash alumina.

12. A process for the preparation of a capture mass as claimed in claim 1, comprising:
   a) preparing a porous support based on alumina;
   b) preparing an aqueous solution containing at least one dissolved copper precursor;
   c) impregnating the solution obtained from b) onto the alumina support obtained from a);
   d) allowing the impregnated support obtained from c) to mature at a temperature in the range 20° C. to 60° C., for a period in the range 0.5 h to 8 h;
   e) drying the solid obtained from d) between 70° C. and 250° C.;
   f) optionally, calcining the solid obtained at the end of e), in air at a temperature in the range 300° C. to 800° C. in a dry atmosphere;
   g) sulphurizing the solid obtained from e) or f) to form an active sulphurized phase $Cu_xS_y$.

13. The process as claimed in claim 12, in which sulphurization g) is carried out using a gaseous mixture of nitrogen and hydrogen sulphide with a molar concentration which is in the range 1000 ppm to 10% and at a temperature in the range 100° C. to 400° C.

14. A process for the reduction of heavy metals, contained in a gaseous or liquid feed, comprising bringing a capture mass according to claim 1 is brought into contact with said feed, wherein said heavy metals are reduced.

15. The process according to claim 14, wherein the heavy metals include mercury.

16. A capture mass capable of capturing heavy metals including mercury, contained in a gaseous or liquid feed, said mass comprising:
   copper which is present at least in part in the sulphide form, $Cu_xS_y$;
   a porous support based on alumina;
   said porous support having a total pore volume (TPV) in the range 0.8 to 1.5 cm³/g, a mesopore volume ($V_{6nm-100nm}$) in the range 0.5 to 1.3 cm³/g, a macropore volume ($V_{100nm}$) in the range 0.35 to 0.42 cm³/g, and a
   ratio between the mesopore volume and the macropore volume ($V_{6nm-100nm}/V_{100nm}$) in the range 1 to 1.86.

* * * * *